United States Patent
Fujimoto et al.

(10) Patent No.: US 9,292,730 B2
(45) Date of Patent: Mar. 22, 2016

(54) APPARATUS FOR PHYSICS AND CHEMISTRY AND METHOD OF PROCESSING IMAGE

(71) Applicant: DAINIPPON SCREEN MFG. CO., LTD., Kyoto (JP)

(72) Inventors: Hiroki Fujimoto, Kyoto (JP); Jiro Tsumura, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 102 days.

(21) Appl. No.: 14/150,338

(22) Filed: Jan. 8, 2014

(65) Prior Publication Data

US 2014/0198966 A1 Jul. 17, 2014

(30) Foreign Application Priority Data

Jan. 11, 2013 (JP) ................. 2013-004058

(51) Int. Cl.
*G06K 9/00* (2006.01)
(52) U.S. Cl.
CPC .................. *G06K 9/00147* (2013.01)
(58) Field of Classification Search
None
See application file for complete search history.

(56) References Cited

U.S. PATENT DOCUMENTS

| | | | |
|---|---|---|---|
| 5,790,691 A | 8/1998 | Narayanswamy et al. | 382/133 |
| 6,385,351 B1 * | 5/2002 | Simske et al. | 382/312 |
| 2004/0048396 A1 * | 3/2004 | Nellis et al. | 436/514 |
| 2005/0002552 A1 * | 1/2005 | Dunn et al. | 382/133 |
| 2007/0133856 A1 | 6/2007 | Dutta-Choudhury | 382/133 |
| 2008/0212866 A1 * | 9/2008 | Lett et al. | 382/133 |
| 2011/0182490 A1 | 7/2011 | Hoyt et al. | 382/128 |
| 2012/0050308 A1 | 3/2012 | Nakano et al. | 345/592 |

FOREIGN PATENT DOCUMENTS

| | | |
|---|---|---|
| JP | 55-044914 | 3/1980 |
| JP | 09-145594 | 6/1997 |
| JP | 11-083848 | 3/1999 |
| JP | 2004-163499 | 6/2004 |
| JP | 2010-151647 | 7/2010 |
| JP | 2011-064602 | 3/2011 |
| JP | 2012-008027 | 1/2012 |
| JP | 2012-045298 | 3/2012 |

OTHER PUBLICATIONS

Notice of Reasons for Refusal dated Apr. 15, 2014 for Japanese Application No. 2013-004058 with English translation.

* cited by examiner

*Primary Examiner* — Hadi Akhavannik
(74) *Attorney, Agent, or Firm* — Ostrolenk Faber LLP

(57) ABSTRACT

Switching between highlighting and unhighlighting of an object determined as adopted and switching between highlighting and unhighlighting of an object determined as not adopted are performed individually and independently by manipulation of an on/off selectable button. This allows switching to be freely performed between the following states in which: objects are highlighted regardless of whether the objects are adopted or not; only an object determined as adopted is highlighted; only an object determined as not adopted is highlighted; and objects are not highlighted regardless of whether the objects are adopted or not. A user visually judges whether the result of the adoption/non-adoption process is proper or not easily while switching between these displays.

12 Claims, 9 Drawing Sheets

APPARATUS FOR PHYSICS AND CHEMISTRY AND METHOD OF PROCESSING IMAGE

BACKGROUND OF THE INVENTION

1. Field of the Invention

The present invention relates to an apparatus for physics and chemistry which processes an image obtained by photographing cells, and a method of processing the image.

2. Description of the Background Art

A screening which narrows down compounds serving as candidates for medical and pharmaceutical products is performed in the course of research and development of the medical and pharmaceutical products. An example of the screening includes: preparing a plurality of culture solutions into which biological cells are put; adding compounds to the culture solutions while changing various conditions to cultivate the cells; and narrowing down the compounds serving as candidates for medical and pharmaceutical products, based on the culture states of the cells.

In such a screening, a reagent has been hitherto used for the assessment of the culture states of the cells. Specifically, a reagent is applied to the cells to cause the fluorescence reaction of specific molecules in the cells. The culture states of the cells are judged by measuring the fluorescence intensity of the specific molecules in the cells. This method, however, has required the costly reagent, and also has required much time for the fluorescence reaction. In addition, this method has not been capable of observing changes in the same cell with time because the reagent destroys cell walls.

In recent years, three-dimensional culture such that cells are cultivated in three dimensions has been performed to investigate the effects of medical and pharmaceutical products in an environment closer to that in a living body. An important object to be observed in such three-dimensional culture is the state of spheroids which are three-dimensionally aggregated cell clumps. The aforementioned method of measuring the fluorescence is not suitable for the observation of the cell clumps.

For these reasons, an attempt has been made in recent years to develop an apparatus for observing the culture states of cells by photographing the cells at a high resolution without using any reagent. This apparatus photographs a well plate having a plurality of depressions or wells for culture at predetermined time intervals to clip images of each of the wells from the resultant photographed images. The clipped images are displayed on a display device, and are compared and analyzed, whereby the culture states of the cells in each well are assessed.

Conventional apparatuses for displaying the images of cells are disclosed, for example, in Japanese Patent Application Laid-Open No. 2010-151647 and in Japanese Patent Application Laid-Open No. 2011-64602.

The operation of assessing the culture states of the cells from the obtained images is performed by human visual judgment in principle. However, burdens on the human visual judgment are reduced if classification is made to some extent by using software in such an apparatus. Thus, the development of the technique of extracting objects presumed to be cells from images to classify the extracted objects as adopted or as not adopted has been advanced in recent years.

For classifying the objects as adopted or as not adopted, parameters such as the area and density of the objects in the images are measured. Then, each of the objects is classified as adopted or as not adopted, based on whether the measurement value for each object is within an allowable range or not. Appropriate setting of the allowable ranges of the parameters is important to increase the accuracy of the judgment as adopted or as not adopted using software.

A large number of parameters, however, are used for the judgment of the objects as adopted or as not adopted. It is a difficult operation for a user unskilled in image processing to appropriately adjust the allowable ranges of such a large number of parameters while viewing the results of judgment of the objects as adopted or as not adopted which are displayed on a screen. For this reason, there is a need for a technique capable of classifying objects as adopted or as not adopted and thereafter displaying the objects classified as adopted and the objects classified as not adopted in an easily distinguishable manner.

SUMMARY OF THE INVENTION

It is therefore an object of the present invention to provide an apparatus for physics and chemistry and a method of processing an image which are capable of individually and independently performing switching between highlighting and unhighlighting of objects classified as adopted and switching between highlighting and unhighlighting of objects classified as not adopted.

A first aspect of the present invention is intended for an apparatus for physics and chemistry which processes an image obtained by photographing cells. The apparatus comprises: an extraction part for extracting a plurality of objects from the image; an adoption/non-adoption processing part for classifying the objects as adopted or as not adopted in accordance with a predetermined condition; and a display part for displaying a result of the adoption/non-adoption process, the display part including a first switching part for switching between highlighting and unhighlighting of an object determined as adopted in the image, and a second switching part for switching between highlighting and unhighlighting of an object determined as not adopted in the image, the first switching part and the second switching part switching between highlighting and unhighlighting of objects independently of each other.

A second aspect of the present invention is intended for an image processing method for processing an image obtained by photographing cells. The image processing method comprises the steps of: a) extracting a plurality of objects from the image; b) classifying the objects as adopted or as not adopted in accordance with a predetermined condition; and c) displaying a result of the adoption/non-adoption process, wherein switching between highlighting and unhighlighting of an object determined as adopted and switching between highlighting and unhighlighting of an object determined as not adopted are performed independently of each other by manipulation of an on/off selectable button in the step c).

According to the first and second aspects of the present invention, switching between highlighting and unhighlighting of an object determined as adopted and switching between highlighting and unhighlighting of an object determined as not adopted are performed individually and independently. Specifically, this allows switching to be freely performed between the following states in which: objects are highlighted regardless of whether the objects are adopted or not; only an object determined as adopted is highlighted; only an object determined as not adopted is highlighted; and objects are not highlighted regardless of whether the objects are adopted or not. A user visually judges whether the result of the adoption/non-adoption process is proper or not easily while switching between these displays.

These and other objects, features, aspects and advantages of the present invention will become more apparent from the following detailed description of the present invention when taken in conjunction with the accompanying drawings.

DESCRIPTION OF THE PREFERRED EMBODIMENTS

A preferred embodiment according to the present invention will now be described with reference to the drawings.

<1. Configuration of Image Acquisition Apparatus>

Figure 1:
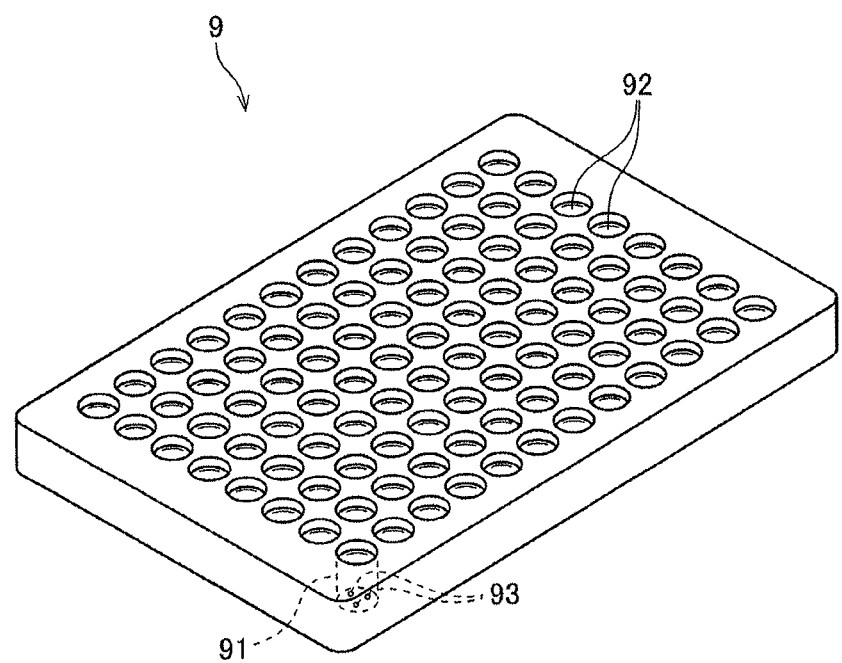
FIG. 1 is a perspective view showing an example of a well plate.

FIG. 1 is a perspective view showing an example of a well plate 9 to be set in an image acquisition apparatus 1. The well plate 9 is a generally plate-shaped specimen container having a plurality of depressions or wells 91. An example of the material of the well plate 9 used herein includes a transparent resin which allows light to pass therethrough. As shown in FIG. 1, the wells 91 are arranged regularly in the upper surface of the well plate 9. Biological cells 93 to be observed are held with a culture solution 92 in each of the wells 91. Compounds with different concentrations and different compositions are added to the culture solution 92 in the wells 91, respectively.

Figure 2:
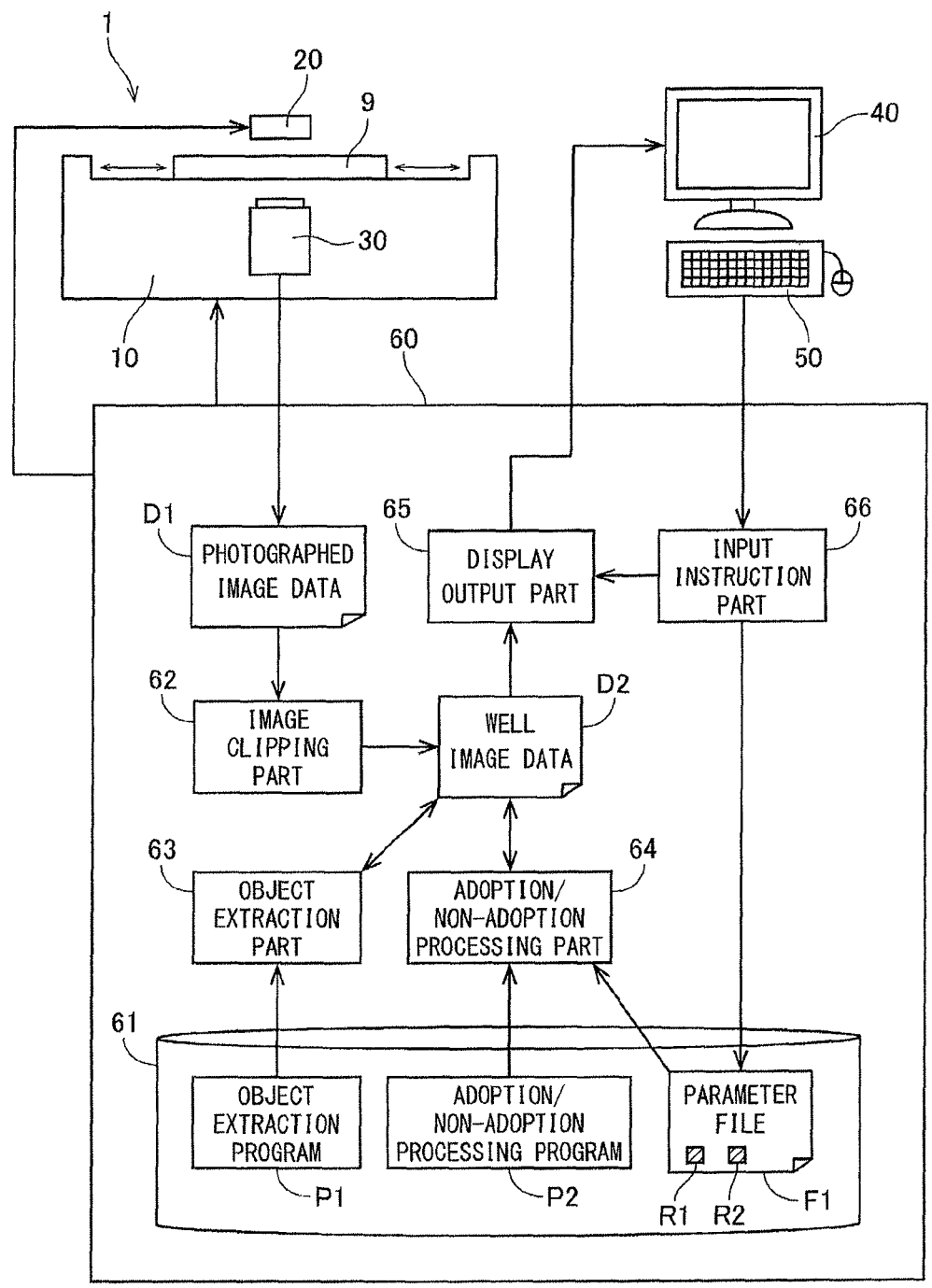
FIG. 2 is a view conceptually showing a configuration of an image acquisition apparatus.

FIG. 2 is a view conceptually showing a configuration of the image acquisition apparatus 1 according to the embodiment of the present invention. This image acquisition apparatus 1 is an apparatus for physics and chemistry which processes image data obtained by photographing the well plate 9. The image acquisition apparatus 1 is used, for example, for a screening step for narrowing down compounds serving as candidates for medical and pharmaceutical products in the field of research and development of the medical and pharmaceutical products. An operator for the screening step uses the image acquisition apparatus 1 to acquire image data about the well plate 9. Then, the operator compares and analyzes the culture states of the cells 93 in the wells 91, based on the acquired image data, to verify the effects of the compounds added to the culture solution 92.

As shown in FIG. 2, the image acquisition apparatus 1 according to the present embodiment includes a plate holder 10, a light emitting part 20, an imaging part 30, a display device 40, an input device 50 and a computer 60. The plate holder 10, the light emitting part 20, the imaging part 30, the display device 40 and the input device 50 are electrically connected to the computer 60.

The plate holder 10 is a table for holding the well plate 9 thereon. The well plate 9 in a horizontal attitude with the bottom thereof downside is set on the plate holder 10. The plate holder 10 includes a drive mechanism not shown for moving the well plate 9 laterally. The drive mechanism includes, for example, a motor, and a power transmission mechanism such as a ball screw for transmitting the driving force of the motor. When the drive mechanism is brought into operation, the well plate 9 moves relative to the imaging part 30, so that the wells 91 come into the field of view of the imaging part 30 in sequential order.

The light emitting part 20 and the imaging part 30 are disposed respectively over and under the well plate 9 held on the plate holder 10. The imaging part 30 is implemented, for example, by a line sensor or an area sensor which includes an optical system such as a lens, and an imaging device such as CCD and CMOS imaging devices. For the photographing of the well plate 9, while white light is directed from the light emitting part 20 toward part of the well plate 9, the imaging part 30 photographs that part of the well plate 9. Then, the well plate 9 is moved laterally, and is photographed in a similar manner repeatedly. As a result, photographed image data D1 about the entire well plate 9 is acquired.

The light emitting part 20 may be any device which directs light toward the well plate 9. The light emitting part 20 may have a light source disposed in a position deviated from over the well plate 9, and configured to direct light therefrom through an optical system such as a mirror onto the well plate 9. Also, the light emitting part 20 may be disposed under the well plate 9, whereas the imaging part 30 be disposed over the well plate 9. Further, the light emitting part 20 may be configured to cause light reflected from the well plate 9 to enter the imaging part 30.

The display device 40 is a section for displaying various pieces of information related to image processing in the image acquisition apparatus 1. The display device 40 displays an image processing window 41 and the like which will be described later. A liquid crystal display, for example, is used as the display device 40. The input device 50 is a section for inputting various commands to the computer 60. A keyboard and a mouse, for example, are used as the input device 50. A user of the image acquisition apparatus 1 may manipulate the input device 50 to input various commands to the computer 60 while viewing the display device 40.

Both the functions of the display device 40 and the functions of the input device 50 may be implemented by a single device such as a touch panel display device.

The computer 60 functions both as a controller for controlling the operations of the aforementioned parts of the image acquisition apparatus 1 and as an image processor for classifying a plurality of objects in the acquired image data as adopted or as not adopted. The computer 60 includes a CPU and a memory. The CPU operates in accordance with previously set computer programs, input signals and various data, whereby the computer 60 controls the operations of the aforementioned drive mechanism, the light emitting part 20 and the imaging part 30. Thus, the photographing of the well plate 9 is performed in the image acquisition apparatus 1.

As conceptually shown in FIG. 2, the computer 60 according to the present embodiment includes a storage part 61, an image clipping part 62, an object extraction part 63, an adoption/non-adoption processing part 64, a display output part 65 and an input instruction part 66. The CPU in the computer 60 performs computation processes while referencing computer programs stored in the storage part 61, whereby the functions of the image clipping part 62, the object extraction part 63, the adoption/non-adoption processing part 64, the display output part 65 and the input instruction part 66 are implemented.

The storage part 61 is a section for storing therein various data to be handled in the image acquisition apparatus 1. The storage part 61 is implemented by a storage device including a hard disk drive, a RAM and the like, for example. The storage part 61 may be part of hardware constituting the computer 60, as shown in FIG. 2, or be an external storage device connected to the computer 60.

As shown in FIG. 2, an object extraction program P1, an adoption/non-adoption processing program P2 and a parameter file F1 for use in image processing to be described later are stored in the storage part 61 according to the present embodiment. The object extraction program P1 and the adoption/non-adoption processing program P2 are read from a computer-readable storage medium including a CD, a DVD and the like, for example, and are stored in the storage part 65. The parameter file F1 includes a first allowable range R1 and a second allowable range R2 of each parameter for reference during the execution of the adoption/non-adoption processing program P2 which are held therein as rewritable data.

<2. Image Processing>
<2-1. Clipping of Image to Display of Window>

Figure 3:
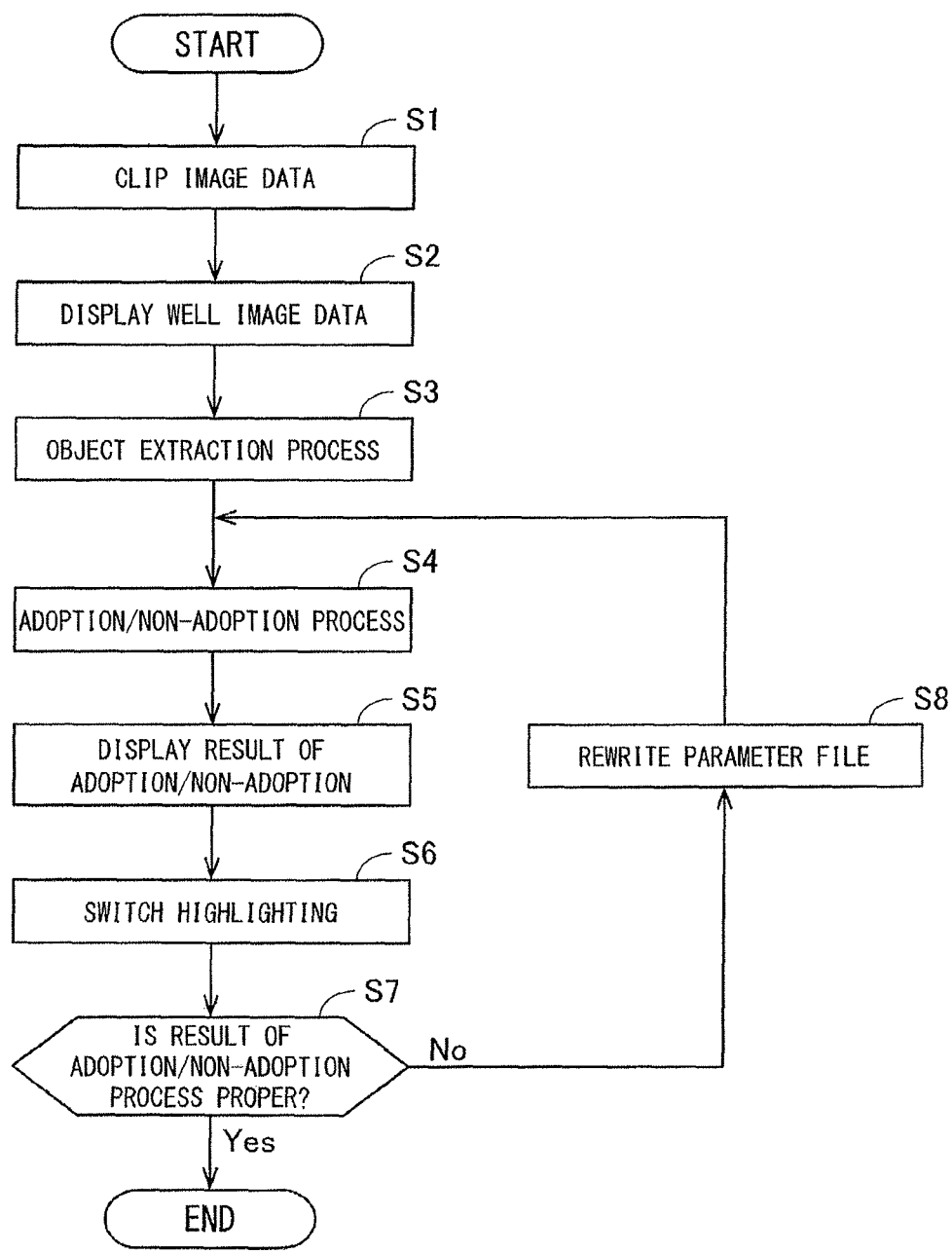
FIG. 3 is a flow diagram showing a procedure of image processing.

FIG. 3 is a flow diagram showing a procedure of the image processing executed in the image acquisition apparatus 1 after the acquisition of the photographed image data D1. The computer 60 operates the image clipping part 62, the object extraction part 63, the adoption/non-adoption processing part 64, the display output part 65 and the input instruction part 66 while referencing input signals from the input device 50, the object extraction program P1, the adoption/non-adoption processing program P2 and the parameter file F1, whereby the image processing shown in FIG. 3 is executed. The procedure of the image processing will be described with reference to FIG. 2 and the flow diagram of FIG. 3.

Upon being acquired in the imaging part 30, the photographed image data D1 is inputted to the image clipping part 62 in the computer 60. The image clipping part 62 clips image data about each of the wells 91 from the photographed image data D1 (in Step S1). The image data about each of the wells 91 is referred to as "well image data D2" hereinafter. Each well image data D2 includes an image of a cell clump that is a group of three-dimensionally aggregated cells 93.

Figure 4:
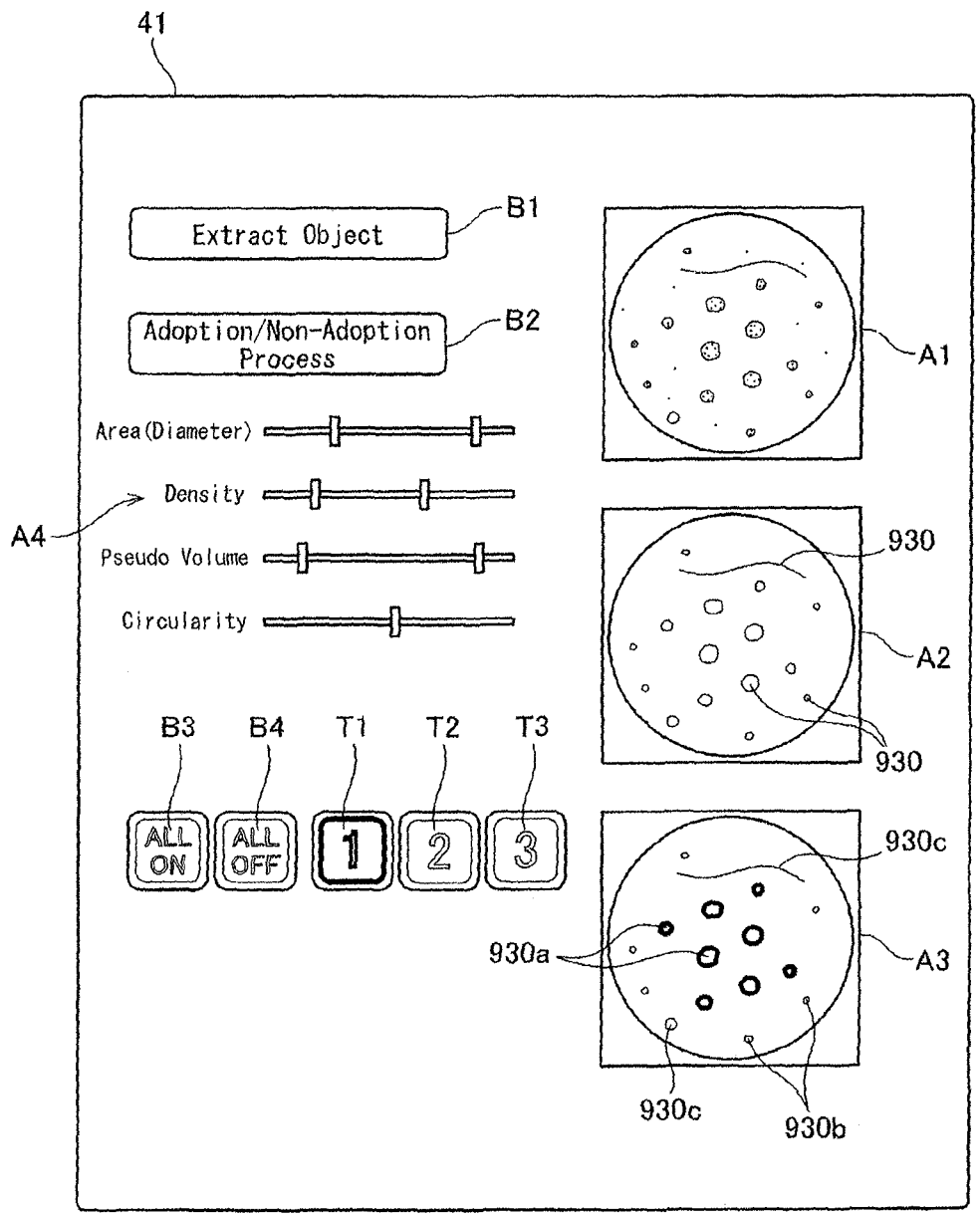
FIG. 4 is a view showing an example of an image processing window.

Next, the display output part 65 causes the display device 40 to display the image processing window 41 serving as a user interface. FIG. 4 is a view showing an example of the image processing window 41. In the example of FIG. 4, three image display regions A1 to A3 are disposed within the image processing window 41. One of the plurality of well image data D2 clipped in Step S1 is displayed in the uppermost image display region A1 (in Step S2).

In the example of FIG. 4, an object extraction button B1 and an adoption/non-adoption processing button B2 are disposed within the image processing window 41. The object extraction button B1 and the adoption/non-adoption processing button B2 are buttons for operating the object extraction part 63 and the adoption/non-adoption processing part 64, respectively, which are described above. The user of the image acquisition apparatus 1 may manipulate the input device 50 to individually and independently select these two buttons B1 and B2. In other words, the user may individually and independently cause the operation of the object extraction part 63 and the operation of the adoption/non-adoption processing part 64.

In the example of FIG. 4, a parameter setting part A4 for setting the second allowable range R2 of each parameter is disposed under the adoption/non-adoption processing button B2. In the parameter setting part A4, the upper limits and the lower limits of the respective parameters (in the example of FIG. 4, the following parameters: "area (diameter)", "density", "pseudo volume" and "circularity") are indicated by the positions of pointers on linear gauges. The upper limit and the lower limit of each of the parameters displayed in the parameter setting part A4 are based on the second allowable range R2 of each of the parameters read from the parameter file F1. The user of the image acquisition apparatus 1 may manipulate the input device 50 to slide each of the pointers leftwardly and rightwardly, thereby changing the upper limit and the lower limit of the second allowable range R2 of each of the parameters.

The parameter setting part A4 need not be displayed in the form of the linear gauges as shown in FIG. 4. For example, the upper limit and the lower limit of the second allowable range R2 may be displayed in text boxes, so that the user makes entries in the text boxes to change the upper limit and the lower limit of the second allowable range R2.

<2-2. Extraction of Objects>

After the image processing window 41 appears, the user of the image acquisition apparatus 1 initially manipulates the input device 50 to select the object extraction button B1 within the image processing window 41. In response to this, the object extraction part 63 performs the process of extracting a plurality of objects 930 from the well image data D2 (in Step S3).

The process of extracting the objects 930 is performed, for example, by extracting pixels having pixel level values falling within a previously set range from the well image data D2. The upper limit of the pixel level value for use in the extraction of the objects 930 may be, for example, a value obtained by multiplying the inputted upper limit of the pixel level value by a predetermined coefficient (e.g., 0.8). The lower limit of the pixel level value for use in the extraction of the objects 930 may be, for example, a value obtained by multiplying the inputted lower limit of the pixel level value by a predetermined coefficient (e.g., 1.2). The upper limit and the lower limit for use in the extraction of the objects 930 may be changed by making entries, depending on whether the result of extraction is appropriate or not.

The well image data D2 after the object extraction is displayed in the middle image display region A2 within the image processing window 41. For example, only the extracted objects are displayed in solid lines, as shown in FIG. 4.

The object extraction part 63 measures a plurality of types of parameters for each of the extracted objects 930. The parameters, i.e. area (diameter), density, pseudo volume and circularity, are measured by image processing in the present embodiment. For area, the diameter of a circle closely resembling an object may be used as a substitute for the area thereof. For pseudo volume, the density of each of the pixels constituting an object may be used as a substitute for the height thereof, and the total value of the density of the respective pixels may be defined as the pseudo volume of a cell presumed from the object.

<2-3. Adoption/Non-Adoption Process>

Next, the user of the image acquisition apparatus 1 manipulates the input device 50 to select the adoption/non-adoption processing button B2 within the image processing window 41. In response to this, the adoption/non-adoption processing part 64 performs an adoption/non-adoption process for classifying the plurality of objects 930 included in the well image data D2 into three categories "adopted", "not adopted" and "excluded from adoption/non-adoption" (in Step S4). In the present embodiment, an object 930a presumed to be a living cell is determined as "adopted", an object 930b presumed to be a dead cell is determined as "not adopted", and an object 930c presumed to be a foreign object other than a cell or an air bubble is determined as "excluded from adoption/non-adoption" which is the third category, in accordance with a predetermined condition.

The process in Step S4 will be described in detail. First, the adoption/non-adoption processing part 64 reads the first allowable range R1 of each parameter from the parameter file F1 stored in the storage part 61. Then, the measurement values of the respective parameters for an object 930 extracted from the well image data D2 are checked in sequential order. When at least one of the parameters is not within the first allowable range R1, this object 930c is determined as "excluded from adoption/non-adoption". When all of the parameters for the object 930 are within the respective first allowable ranges R1, this object 930 is determined as "to be subjected to adoption/non-adoption".

Next, the adoption/non-adoption processing part 64 reads the second allowable range R2 of each parameter from the parameter file F1 stored in the storage part 61. Then, the measurement values of the respective parameters for the object 930 determined as "to be subjected to adoption/non-adoption" are checked in sequential order. When at least one of the parameters is not within the second allowable range R2, this object 930 is determined as b "not adopted". When all of the parameters for the object 930 are within the respective allowable ranges, this object 930a is determined as "adopted".

<2-4. Display of Adoption/Non-Adoption Result to Process of Making Adoption/Non-Adoption Result Proper>

After the completion of the adoption/non-adoption process, the display output part 65 displays the result of the adoption/non-adoption process for each of the objects 930 in the lower image display region A3 within the image processing window 41 (in Step S5). In the image display region A3, some or all of the objects 930 in the well image data D2 can be highlighted with colored outlines. For example, only the object 930a determined as "adopted" in the adoption/non-adoption process can be highlighted with colored outlines. This allows visual discrimination between the objects 930 being highlighted and the objects 930 not being highlighted.

The highlighting is achieved, for example, by producing a closed curve along the outline of an object 930 and displaying the closed curve superimposed on the object 930. Emphasizing the outline of the object 930 in this manner makes it easy to visually recognize the size and shape of the object. Thus, whether the result of the adoption/non-adoption process is proper or not is more easily judged in Step S7 to be described later.

As shown in FIG. 4, a first toggle button T1, a second toggle button T2 and a third toggle button T3 are disposed near the image display region A3 of the image processing window 41. The user of the image acquisition apparatus 1 manipulates the input device 50 to select these toggle buttons T1 to T3, thereby individually and independently toggling each of the toggle buttons T1 to T3 on and off.

The first toggle button T1 is a button for switching between highlighting and unhighlighting of the objects 930a determined as "adopted" in Step S4. When the first toggle button T1 is toggled on, the objects 930a determined as "adopted" are highlighted with colored outlines in the image display region A3. When the first toggle button T1 is toggled off, on the other hand, the highlighting of the objects 930a determined as "adopted" is cleared. That is, the first toggle button T1 constitutes a first switching part in the present embodiment.

The second toggle button T2 is a button for switching between highlighting and unhighlighting of the objects 930b determined as "not adopted" in Step S4. When the second toggle button T2 is toggled on, the objects 930b determined as "not adopted" are highlighted with colored outlines in the image display region A3. When the second toggle button T2 is toggled off, on the other hand, the highlighting of the objects 930b determined as "not adopted" is cleared. That is, the second toggle button T2 constitutes a second switching part in the present embodiment.

The third toggle button T3 is a button for switching between highlighting and unhighlighting of the objects 930c determined as "excluded from adoption/non-adoption" in Step S4. When the third toggle button T3 is toggled on, the objects 930c determined as "excluded from adoption/non-adoption" are highlighted with colored outlines in the image display region A3. When the third toggle button T3 is toggled off, on the other hand, the highlighting of the objects 930c determined as "excluded from adoption/non-adoption" is cleared. That is, the third toggle button T3 constitutes a third switching part in the present embodiment.

As mentioned above, the first toggle button T1, the second toggle button T2 and the third toggle button T3 are individually and independently toggled on and off. Thus, the user of the image acquisition apparatus 1 is able to individually and independently switch between highlighting and unhighlighting of the objects 930 determined as "adopted", "not adopted" and "excluded from adoption/non-adoption" in the well image data D2 displayed in the image display region A3.

FIGS. 5 to 14 are views showing examples of the image display region A3, the three toggle buttons T1 to T3, a select all button B3 to be described later, and a clear all button B4 to be described later in various manipulating states.

Figure 5:
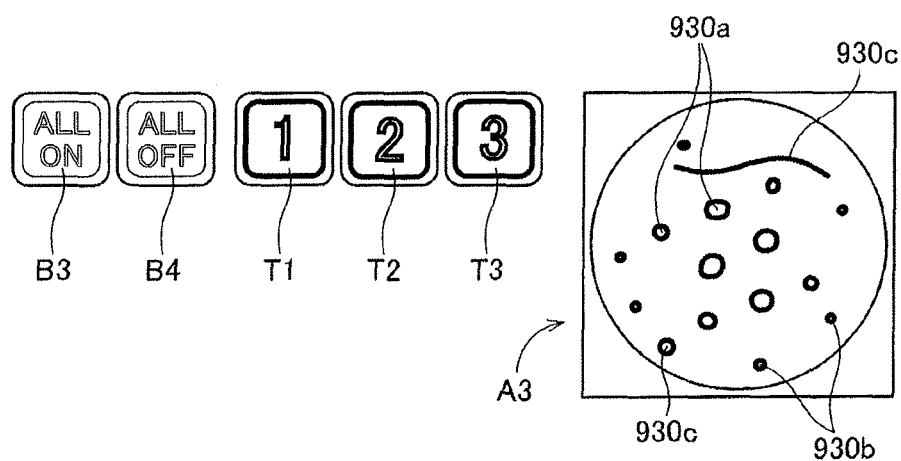
FIG. 5 is a view showing an image display region, three toggle buttons, a select all button, and a clear all button.

As shown in FIG. 5, the objects 930a determined as "adopted", the objects 930b determined as "not adopted" and the objects 930c determined as "excluded from adoption/non-adoption" are highlighted with colored outlines, when the first toggle button T1 is on, the second toggle button T2 is on and the third toggle button T3 is on. That is, all of the objects 930 in the well image data D2 are highlighted.

Figure 6:
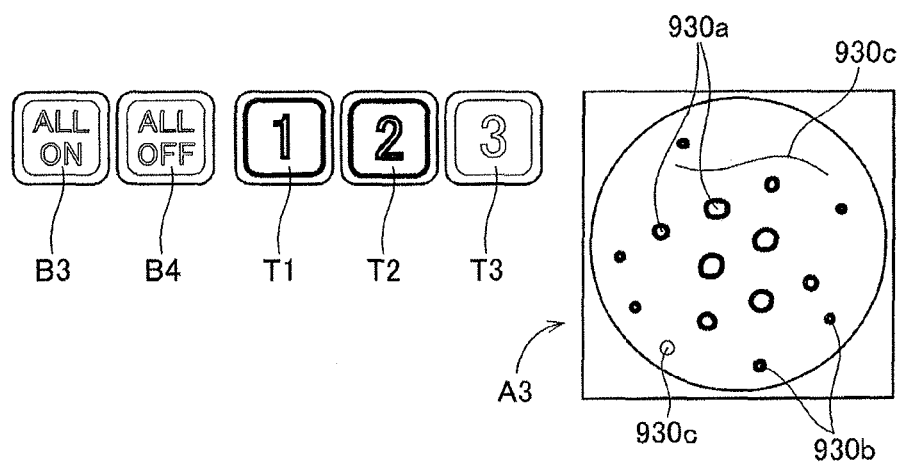
FIG. 6 is a view showing the image display region, the three toggle buttons, the select all button, and the clear all button.

As shown in FIG. 6, the objects 930a determined as "adopted" and the objects 930b determined as "not adopted" are highlighted with colored outlines, when the first toggle button T1 is on, the second toggle button T2 is on and the third toggle button T3 is off. That is, the objects 930 presumed to be cells are highlighted with colored outlines regardless of whether the objects 930 are adopted or not. The highlighting of only the objects 930c determined as "excluded from adoption/non-adoption" is cleared.

Figure 7:
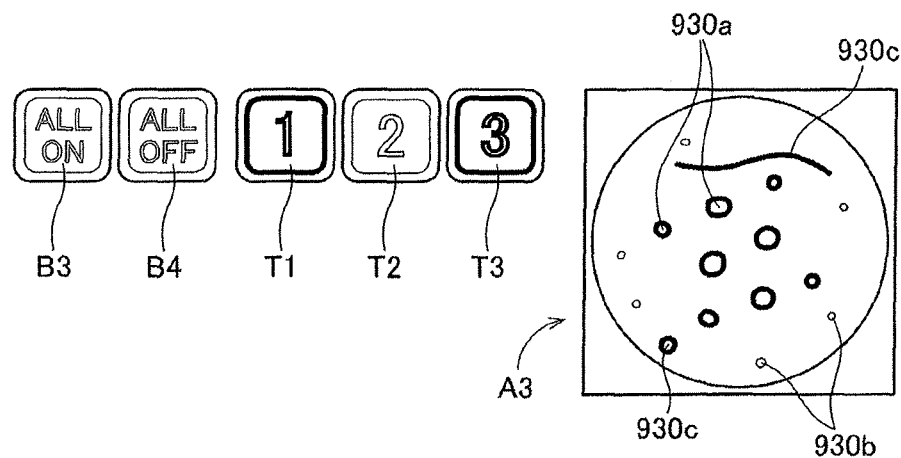
FIG. 7 is a view showing the image display region, the three toggle buttons, the select all button, and the clear all button.

As shown in FIG. 7, the objects 930a determined as "adopted" and the objects 930c determined as "excluded from adoption/non-adoption" are highlighted with colored outlines, when the first toggle button T1 is on, the second toggle button T2 is off and the third toggle button T3 is on. The highlighting of only the objects 930b determined as "not adopted" is cleared.

Figure 8:
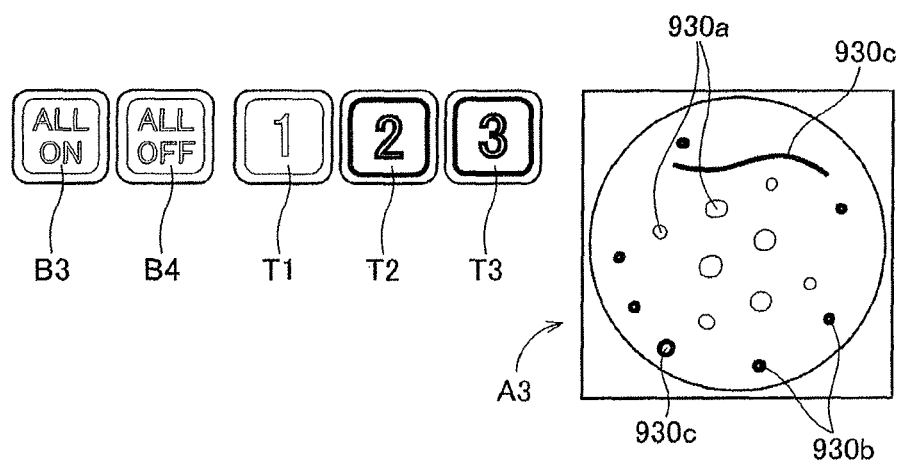
FIG. 8 is a view showing the image display region, the three toggle buttons, the select all button, and the clear all button.

As shown in FIG. 8, the objects 930b determined as "not adopted" and the objects 930c determined as "excluded from adoption/non-adoption" are highlighted with colored outlines, when the first toggle button T1 is off, the second toggle button T2 is on and the third toggle button T3 is on. The highlighting of only the objects 930a determined as "adopted" is cleared.

Figure 9:
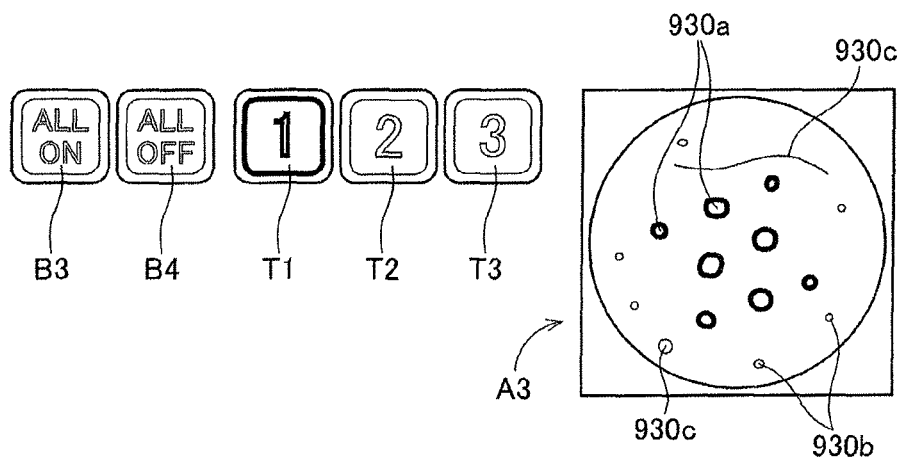
FIG. 9 is a view showing the image display region, the three toggle buttons, the select all button, and the clear all button.

As shown in FIG. 9, only the objects 930a determined as "adopted" are highlighted with colored outlines, when the first toggle button T1 is on, the second toggle button T2 is off and the third toggle button T3 is off. The highlighting of the objects 930b determined as "not adopted" and the objects 930c determined as "excluded from adoption/non-adoption" is cleared.

Figure 10:
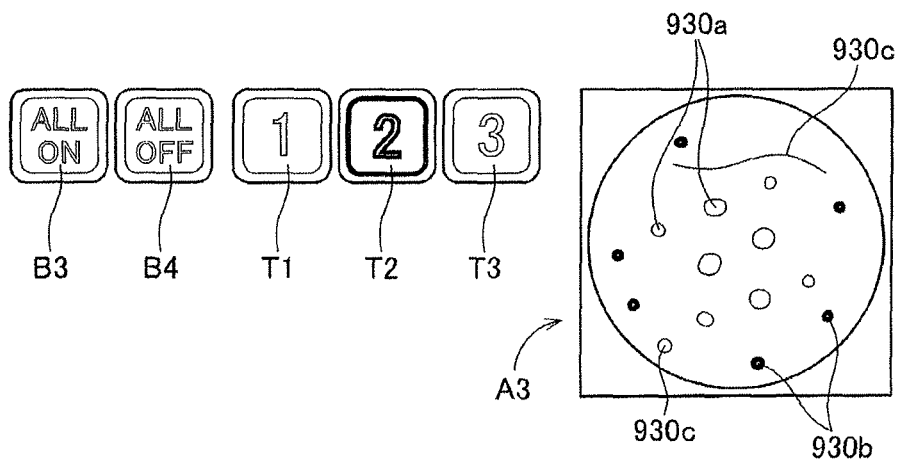
FIG. 10 is a view showing the image display region, the three toggle buttons, the select all button, and the clear all button.

As shown in FIG. 10, only the objects 930b determined as "not adopted" are highlighted with colored outlines, when the first toggle button T1 is off, the second toggle button T2 is on and the third toggle button T3 is off. The highlighting of the objects 930a determined as "adopted" and the objects 930c determined as "excluded from adoption/non-adoption" is cleared.

Figure 11:
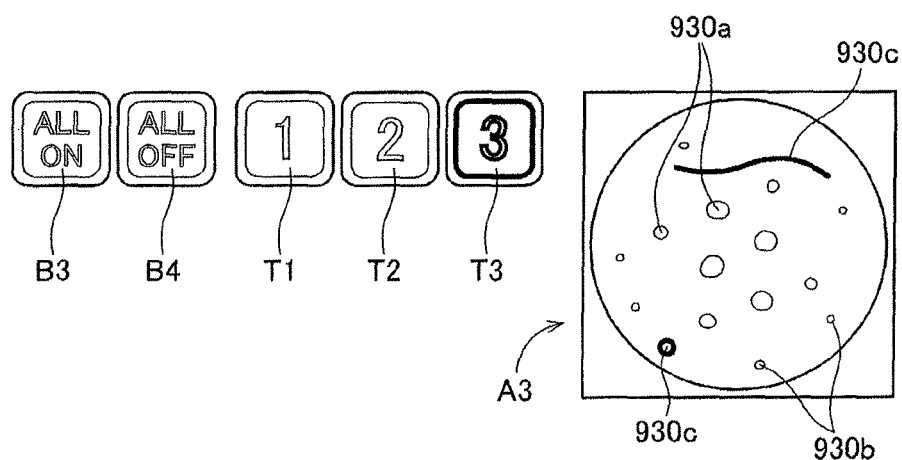
FIG. 11 is a view showing the image display region, the three toggle buttons, the select all button, and the clear all button.

As shown in FIG. 11, only the objects 930c determined as "excluded from adoption/non-adoption" are highlighted with colored outlines, when the first toggle button T1 is off, the second toggle button T2 is off and the third toggle button T3 is on. The highlighting of the objects 930a determined as "adopted" and the objects 930b determined as "not adopted" is cleared. That is, the highlighting of the objects 930 presumed to be cells is cleared regardless of whether the objects 930 are adopted or not.

Figure 12:
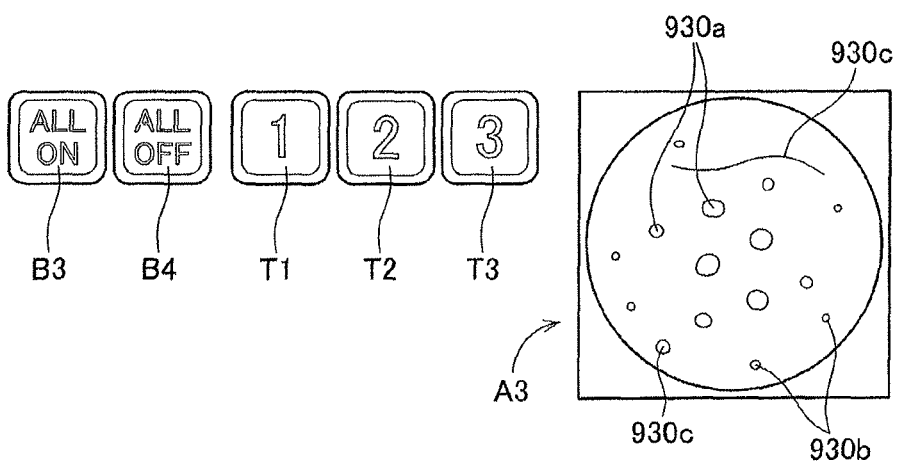
FIG. 12 is a view showing the image display region, the three toggle buttons, the select all button, and the clear all button.

As shown in FIG. 12, the highlighting of the objects 930a determined as "adopted", the objects 930b determined as "not adopted" and the objects 930c determined as "excluded from adoption/non-adoption" is cleared, when the first toggle button T1 is off, the second toggle button T2 is off and the third toggle button T3 is off. That is, the highlighting of all of the objects 930 in the well image data D2 is cleared.

Figure 13:
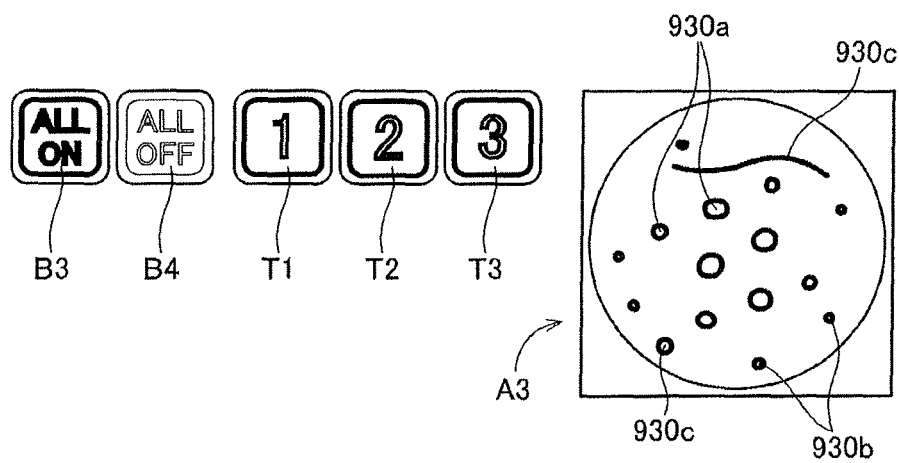
FIG. 13 is a view showing the image display region, the three toggle buttons, the select all button, and the clear all button.

As shown in FIGS. 4 to 14, the select all button B3 and the clear all button B4 are disposed next to the three toggle buttons T1 to T3 in the image processing window 41 in the present embodiment. As shown in FIG. 13, all of the first toggle button T1, the second toggle button T2 and the third toggle button T3 are on, when the select all button B3 is on. Thus, all of the objects 930 displayed in the image display region A3 are highlighted. By the use of the select all button B3, all of the objects 930 are highlighted easily with a smaller number of manipulations.

Figure 14:
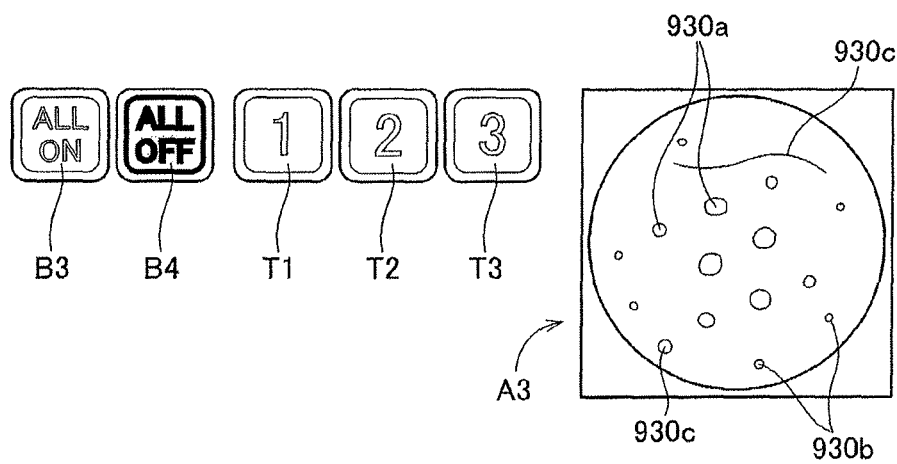
FIG. 14 is a view showing the image display region, the three toggle buttons, the select all button, and the clear all button.

As shown in FIG. 14, all of the first toggle button T1, the second toggle button T2 and the third toggle button T3 are off, when the clear all button B4 is on. Thus, the highlighting of all of the objects 930 displayed in the image display region A3 is cleared. By the use of the clear all button B4, the highlighting of all of the objects 930 is cleared easily with a smaller number of manipulations.

The user of the image acquisition apparatus 1 manipulates the first toggle button T1, the second toggle button T2, the third toggle button T3, the select all button B3 and the clear all button B4 to freely perform switching between the states of FIGS. 5 to 14 (in Step S6). While viewing these screens displayed on the display device 40, the user of the image acquisition apparatus 1 judges whether the result of the adoption/non-adoption process in Step S4 is proper or not (in Step S7).

In Step S7, whether there is an object whose category is desired to change between "adopted", "not adopted" and "excluded from adoption/non-adoption" among the plurality of objects 930 displayed in the image display region A3 or not is judged. When there is an object whose category is desired to change (No in Step S7), the user of the image acquisition apparatus 1 manipulates the input device 50 to rewrite the parameter file F1 (in Step S8). Specifically, the user changes the first allowable range R1 and the second allowable range R2 in the parameter file F1 so that the category of the object 930 is appropriately changed. For example, the user slides any pointer in the parameter setting part A4 within the image processing window 41 to change the upper limit or the lower limit of the second allowable range R2.

Thereafter, the procedure returns to Step S4, and the processes in Steps S4 to S7 are executed again. In Step S4, the adoption/non-adoption processing part 64 performs the adoption/non-adoption process on the plurality of objects 930, based on the first allowable range R1 and the second allowable range R2 which are changed. In Step S7, the user of the image acquisition apparatus 1 judges whether the new result of the adoption/non-adoption process is proper or not, while referencing the image display region A3.

As described above, the image acquisition apparatus 1 according to the present embodiment is capable of individually and independently switching between highlighting and unhighlighting of the objects determined as "adopted", "not adopted" and "excluded from adoption/non-adoption". This allows the user of the image acquisition apparatus 1 to visually judge whether the result of the adoption/non-adoption process is proper or not easily while performing switching between these displays.

<3. Modifications>

While the one embodiment according to the present invention has been described hereinabove, the present invention is not limited to the aforementioned embodiment.

Although the three toggle buttons T1 to T3 are toggled on and off in the aforementioned embodiment, other on/off selectable buttons such a check box and a radio button may be used in place of the toggle buttons.

The select all button B3 and the clear all button B4 are separate buttons in the aforementioned embodiment. However, the function of the select all button B3 and the function of the clear all button B4 may be implemented by a single toggle button. For example, the toggle button may be configured to highlight all of the objects displayed in the image display region A3 when the toggle button is on and to clear the highlighting of all of the objects displayed in the image display region A3 when the toggle button is off.

Although the objects 930 are highlighted with the colored outlines in the aforementioned embodiment, other display forms may be used to highlight the objects 930. For example, each object 930 may be highlighted by coloring the outline of the object and the entire inside of the outline.

For highlighting, the colors of the outlines of the objects 930 determined as "adopted", "not adopted" and "excluded from adoption/non-adoption" may be made different from each other. For highlighting of two or more categories, as shown in FIGS. 5 to 8 or FIG. 13, this allows discrimination between the highlighted objects 930 on a category-by-category basis. Also, the colors of the outlines of the objects 930 in the same category may be made different in accordance with the measurement values of the parameters.

The number of wells 91 included in the well plate 9 may be different from that shown in the example of FIG. 1. The shape of the wells 91 may be circular as seen in top plan view as shown in FIG. 1, and may be other shapes such as a rectangular shape.

The image processing window 41 appearing on the display device 40 may be displayed in a different manner, so long as equivalent information is displayed thereon. In the aforementioned embodiment, the objects are classified into the three categories: "adopted", "not adopted" and "excluded from adoption/non-adoption". However, the categories into which the classification is performed by the adoption/non-adoption process may be only two categories: "adopted" and "not adopted". Also, other categories into which the classification is performed may be prepared in addition to "adopted", "not adopted" and "excluded from adoption/non-adoption".

The components described in the aforementioned embodiment and in the various modifications may be consistently combined together, as appropriate.

While the invention has been described in detail, the foregoing description is in all aspects illustrative and not restrictive. It is understood that numerous other modifications and variations can be devised without departing from the scope of the invention.

What is claimed is:

1. An apparatus for physics and chemistry which processes an image obtained by photographing cells, comprising:
    an extraction part for extracting a plurality of objects from said image;
    an adoption/non-adoption processing part for classifying said objects as adopted, as not adopted or as a third category in accordance with a predetermined condition; and
    a display part for displaying a result of said adoption/non-adoption process,
    said display part including
    a first switching part for switching between highlighting and unhighlighting of an object determined as adopted in said image,
    a second switching part for switching between highlighting and unhighlighting of an object determined as not adopted in said image, and
    a third switching part for switching between highlighting and unhighlighting of an object determined as the third category in said image,
    said first switching part, said second switching part and said third switching part are configured for switching between highlighting and unhighlighting of objects independently of each other.

2. The apparatus for physics and chemistry according to claim 1,
    wherein said highlighting is outline highlighting such that a closed curve along the outline of an object is displayed so as to be superimposed on said object.

3. The apparatus for physics and chemistry according to claim 1,
    wherein said display part further includes
    a select all part for highlighting all objects in said image.

4. The apparatus for physics and chemistry according to claim 1,
    wherein said display part further includes
    a clear all part for clearing the highlighting of all objects in said image.

5. The apparatus for physics and chemistry according to claim 1,
    wherein said image is an image of each well of a specimen container having a plurality of wells.

6. The apparatus for physics and chemistry according to claim 1,
    wherein said image is an image of a cell clump that is a group of three-dimensionally aggregated cells.

7. An image processing method for processing an image obtained by photographing cells, said method comprising the steps of:
    a) extracting a plurality of objects from said image;
    b) classifying said objects as adopted, as not adopted or as a third category in accordance with a predetermined condition; and
    c) displaying a result of said adoption/non-adoption process, and
    d) further comprising the steps of: switching between highlighting and unhighlighting of an object determined as adopted, switching between highlighting and unhighlighting of an object determined as not adopted and switching between highlighting and unhighlighting of an object determined as the third category, said switching steps being performed independently of each other by manipulation of an on/off selectable button in said step c).

8. The image processing method according to claim 7,
    wherein said highlighting is outline highlighting such that a closed curve along the outline of an object is displayed so as to be superimposed on said object.

9. The image processing method according to claim 7,
    wherein all objects in said image are highlighted by manipulating a select all button different from said on/off selectable button in said step c).

10. The image processing method according to claim 7,
    wherein the highlighting of all objects in said image is cleared by manipulating a clear all button different from said on/off selectable button in said step c).

11. The image processing method according to claim 7,
    wherein said image is an image of each well of a specimen container having a plurality of wells.

12. The image processing method according to claim 7,
    wherein said image is an image of a cell clump that is a group of three-dimensionally aggregated cells.

* * * * *